Mar. 27, 1923.
O. H. COOPER.
EMERGENCY HUB FOR AUTOMOBILE WHEELS.
FILED SEPT. 14, 1921.
1,450,062.
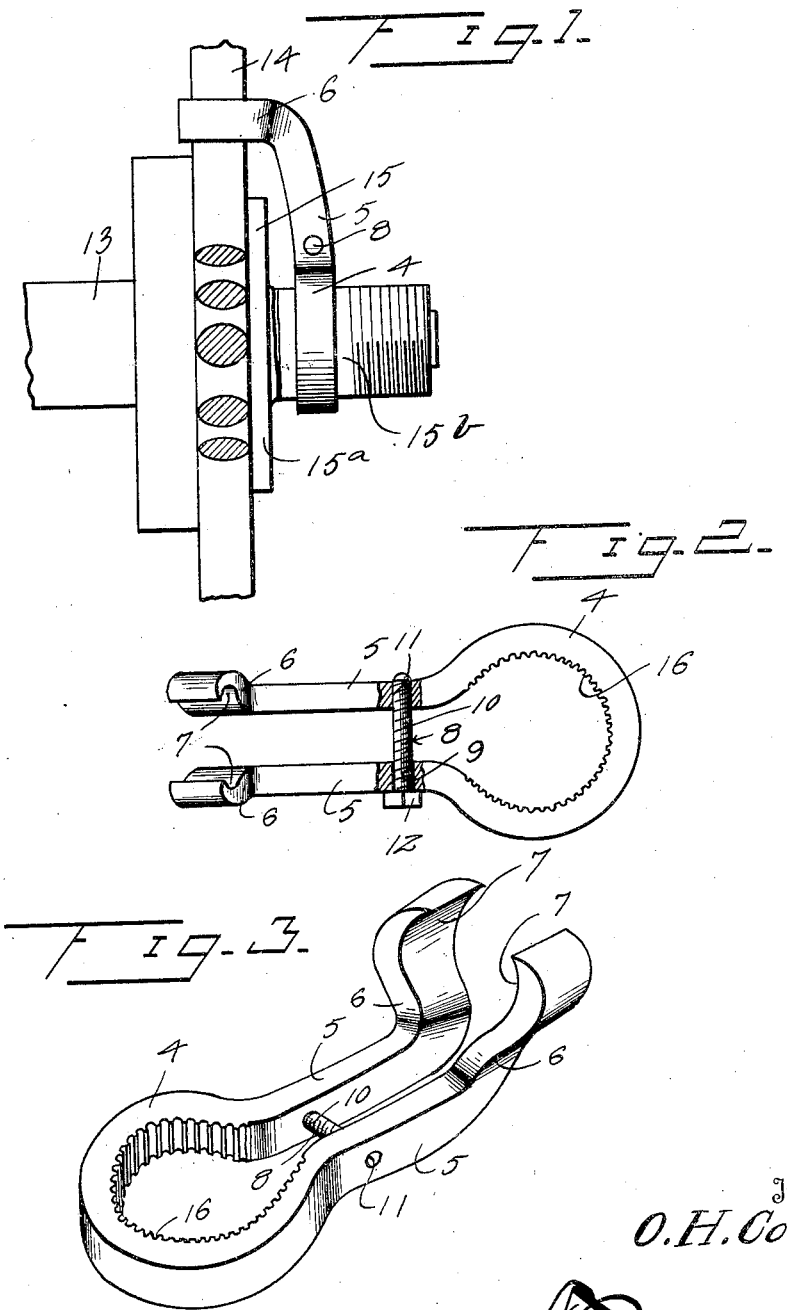
Inventor
O. H. Cooper
By 
Attorney Patented Mar. 27, 1923.

1,450,062

UNITED STATES PATENT OFFICE.

OTTO H. COOPER, OF SHAMROCK, LOUISIANA.

EMERGENCY HUB FOR AUTOMOBILE WHEELS.

Application filed September 14, 1921. Serial No. 500,620.

*To all whom it may concern:*

Be it known that I, OTTO H. COOPER, a citizen of the United States, residing at Shamrock, in the parish of Natchitoches and State of Louisiana, have invented certain new and useful Improvements in Emergency Hubs for Automobile Wheels; and I do hereby declare the following to be a full, clear, and exact description of the invention, such as will enable others skilled in the art to which it appertains to make and use the same.

This invention relates to an emergency or repair hub for automobile wheels.

Hubs, particularly those of the rear wheels of automobiles frequently break, and as the accident often occurs when a new hub is not immediately accessible, the present invention aims to provide a simple and practical substitute or repair hub which may be used in place of the injured one to enable further use of the wheel at least until a service station can be reached or a new hub obtained.

Specific structural objects and advantages will appear as the description thereof hereinafter progresses, and is considered in connection with accompanying drawings illustrating one practical embodiment.

In said drawings:—

Figure 1 is a view illustrating a wheel, hub and axle, with my emergency hub used in connection therewith, and with the parts principally shown in section to expose details.

Figure 2 is a side elevation of the emergency hub;

Figure 3 is a perspective view of said hub.

Throughout the different views, like reference characters designate like or similar parts.

Referring specifically to the drawings, the hub may be made essentially from a bar of relatively stiff, thick, slightly resilient metal which is bent intermediate its ends to form an axle or spindle embracing loop or band 4. Distance arms, preferably parallel with each other, extend at 5 from the terminals of the band 4, and at 6, arms 5 are deflected laterally to provide attaching jaws, dished or arcuate as at 7 to conform to the curvature of a wheel spoke. The band 4 may be contracted or expanded and the jaws 6 moved toward or away from each other, through the medium of a single means, such as a bolt or screw having its shank 8 loosely passing through an opening 9 in one arm 5 and having screw threads at 10, to engage screw threads within an opening 11, in the other arm 5. A wrench engaging head 12, for instance hexagonal as shown, may be provided on the bolt shank 8. To facilitate an understanding of the invention, a rear axle 13 is shown to which a wheel 14 is fixed by means including a hub plate 15. This construction is the equivalent of that used to secure the rear wheels to the axle of a 1921 model, Ford automobile. It is the hub or plate 15 which is referred to in this application as breaking in some instances. When the flange 15$^a$ of such plate 15 breaks from the sleeve 15$^b$ the adjacent wheel is loosely journalled and will not be positively drawn. The usual hub cap is then preferably removed from sleeve 15$^b$ to save it and to permit band 14 to be more easily placed around the sleeve 15$^b$ while a spoke of the wheel is received between the jaws 6. The bolt 12 may then be tightened, which will bind the band 4 tightly to the sleeve 15$^b$ and will clamp the jaws 6 to the spoke. Thus the band and jaws are fastened rigidly by a single fastening means.

In order that the degree of engagement between the band 4 and sleeve 15$^b$ may be increased, the inner surface of said band 4 may be roughened as by milling or serrating as at 16.

Changes within the spirit and scope as defined by appended claims, may be made.

What is claimed is:—

1. A device of the class described comprising a bar having an attaching band portion of loop shape, coacting jaws at a distance from the band portion, and fastening means intermediate said portion and said jaws operable to simultaneously apply pressure to said band portion and said jaws.

2. A device of the class described having a fastening band of loop shape, coacting jaws at a distance therefrom and offset, and fastening means intermediate the jaws and band operable to simultaneously apply pressure to said band portion and said jaws.

3. A device of the class described consisting of a bar having an attaching portion intermediate its ends, lateral offset jaws at the terminals of the bar, distancing portions intermediate the jaws and band, and a fastening means mounted in the distancing portions intermediate the jaws and band.

In testimony whereof I affix my signature in presence of two witnesses.

OTTO H. COOPER.

Witnesses:
CHARLES B. BYLES,
C. M. HARRISON.